T. G. MARTIN.
MACHINE FOR MAKING STAVES.
APPLICATION FILED SEPT. 22, 1911.
1,032,226.
Patented July 9, 1912.
3 SHEETS—SHEET 2.
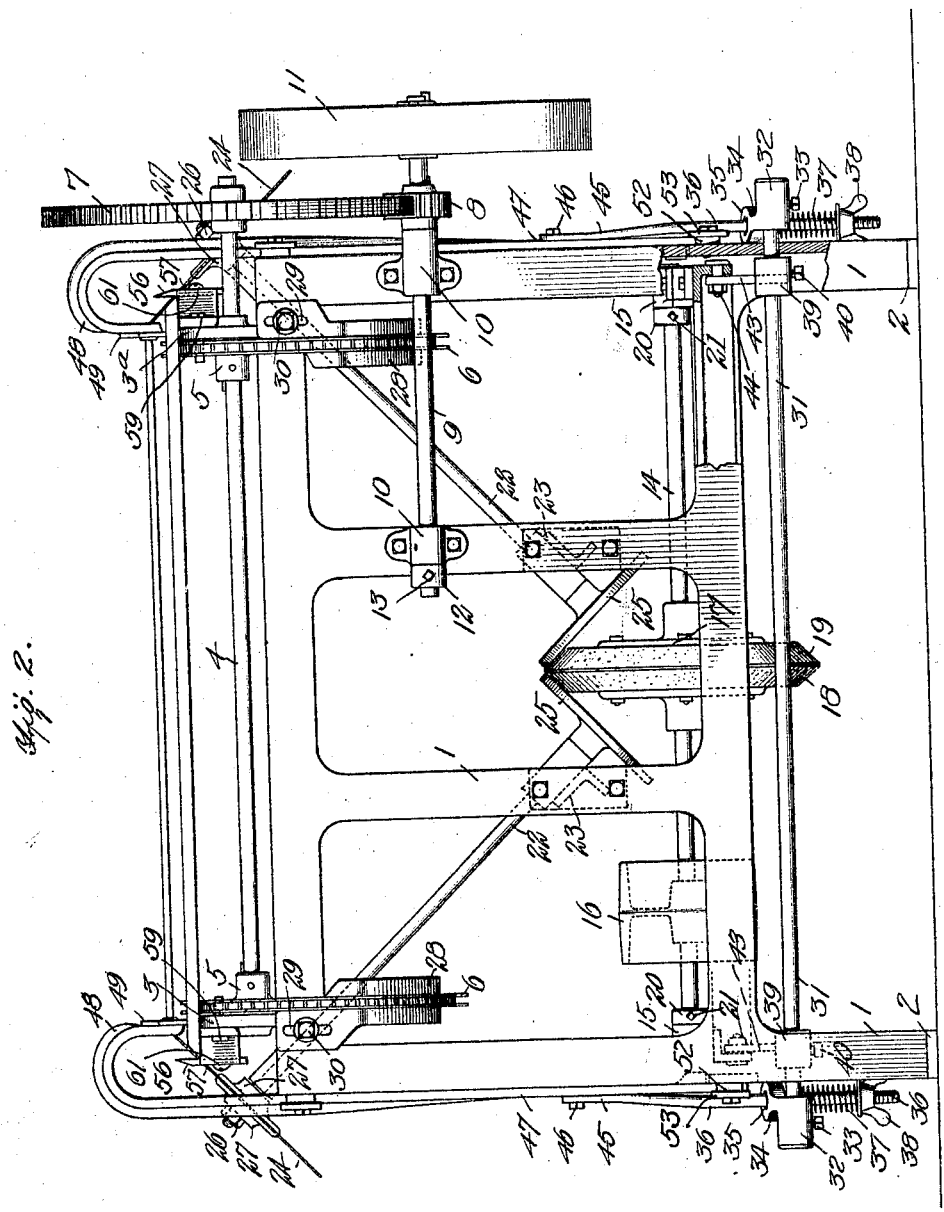
WITNESSES
INVENTOR
THOMAS G. MARTIN,
BY
ATTORNEYS

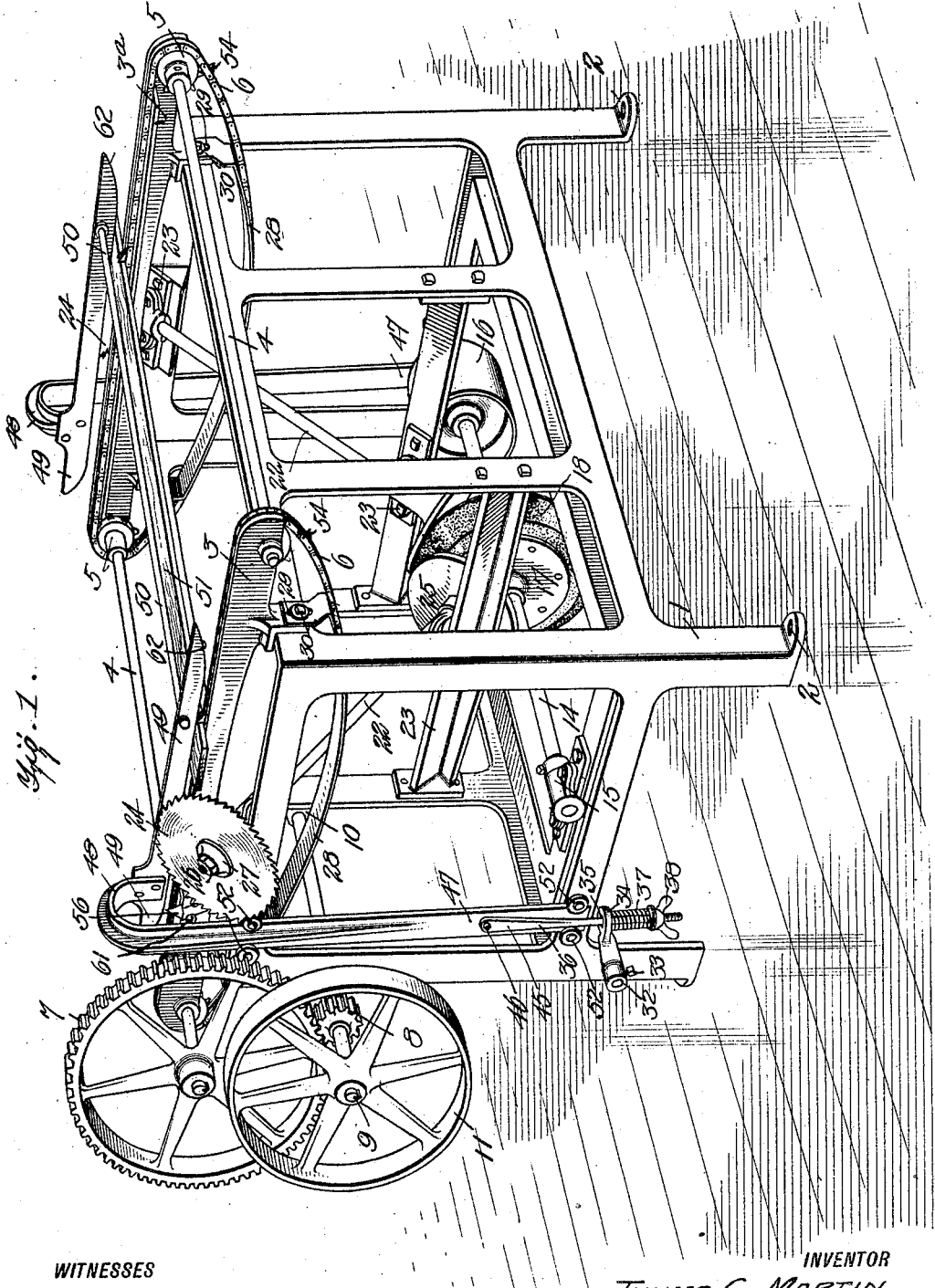

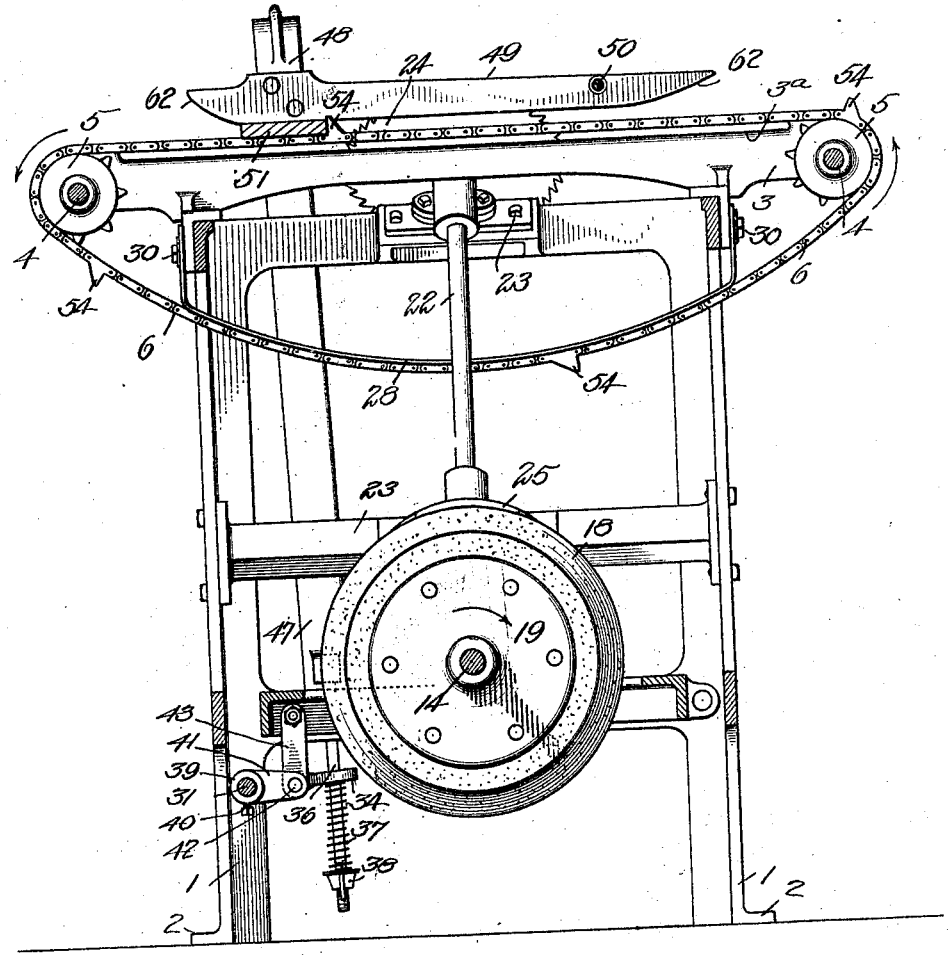
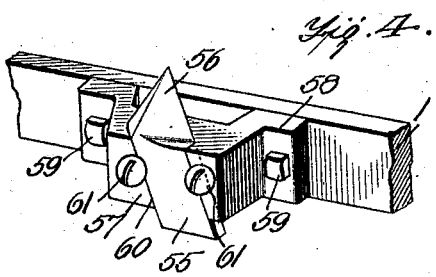

UNITED STATES PATENT OFFICE.

THOMAS G. MARTIN, OF PARKERSBURG, WEST VIRGINIA.

MACHINE FOR MAKING STAVES.

1,032,226.

Specification of Letters Patent. Patented July 9, 1912.

Application filed September 22, 1911. Serial No. 650,724.

*To all whom it may concern:*

Be it known that I, THOMAS G. MARTIN, a citizen of the United States, and a resident of Parkersburg, in the county of Wood and State of West Virginia, have invented certain Improvements in Machines for Making Staves, of which the following is a specification.

My invention is an improvement in stave machines, and has for its object, the provision in a machine of the character specified, of new and improved means for cutting and equalizing staves, while the staves are being moved continuously through the machine.

In the drawings: Figure 1 is a perspective view of the improvement; Fig. 2 is an end view; Fig. 3 is a transverse vertical section; and, Fig. 4 is an enlarged detail view of one of the blades.

In the present embodiment of the invention, a frame 1 is provided, having lateral perforated lugs 2, for receiving bolts or the like, to hold the frame to the floor. A guide plate 3, is arranged transversely of the frame, at each end, and a shaft 4 is journaled longitudinally of the frame, at each side, in the extended ends of the plates. A sprocket wheel 5 is secured to each end of each shaft, adjacent to the plate, and chains 6 are arranged transversely of the frame, near each plate, running on the wheels 5. A gear wheel 7 is secured to one of the shafts 4, the said shaft being extended beyond the frame at one end to receive the gear wheel. The wheel 7 meshes with a pinion 8 on a shaft 9, journaled in bearings 10 on the frame, and the said shaft 9 is provided with a pulley 11, for receiving a belt, (not shown) for operating the machine. The shaft 9 is held from longitudinal movement in the bearings, by means of the pinion 8, and a collar 12, secured to the end of the shaft by a set screw 13.

A shaft 14 is journaled in sectional bearings 15, on a swinging frame 14ᵃ hinged at one side edge to the main frame as shown at 62. The said shaft is provided with a pulley 16 near one end, and with a friction disk 17 at its center, the said disk having oppositely arranged bevel faces 18 and 19. The shaft is also provided with collars 20 near each end to hold it from longitudinal movement, and the collars are held in place by set screws 21.

A shaft 22 is journaled on each side of disk 17, and in inclined position, in bearings 23 on the frame. The upper end of each shaft 22 extends outside of the frame, and is provided with a circular saw 24, and the inner and lower end of each shaft is provided with a friction disk 25, which engages the adjacent face of disk 17. The upper and outer end of each shaft 22 is threaded, and the saw is held in place by washers and nuts 27 and 26 on the threaded portion. A curved guard plate 28 is arranged above each chain, each end of each plate being offset laterally outward, and provided with a longitudinal slot 29, which is engaged by a bolt 30 on the frame. By loosening the bolts, the plates may be adjusted with respect to the chains.

A shaft 31 is arranged parallel with the shaft 14, below the free end of the swinging frame 14ᵃ, the said shaft 31 being journaled on the adjacent uprights of the frame. Sleeves 39 are arranged on the shaft near each end of the swinging frame 14ᵃ, each sleeve being held in place by a set screw 40 and having a radial arm 41, whose free end is connected to the adjacent corner of the frame 14ᵃ, by means of a hanger plate 43. One end of each hanger plate is pivoted to the swinging frame as shown at 44 and the other end is pivoted to the arm as shown at 42. A sleeve 32 is arranged on each end of the shaft 31, each sleeve being held in place by a set screw 33 and being provided with a radial lug 34, having a vertical opening 35. A rod 36 is passed through the opening of each lug and a spring 37 encircles the rod between the lower face of the lug and a nut 38, threaded on to the lower end of the rod. The upper end of each rod 36 is flattened as shown at 45 and is secured to a bar 47 by means of a bolt 46. The bars 47 extend upwardly outside the frame, and the upper end of each bar is arched over and downwardly at 48, and a gage or guide plate 49 is supported by the portions 48 of each bar. The plates are connected to the bar near one end of the plates, and the other ends of the plates are connected by a rod 50. The lower edges of the plates 49 are spaced above the chains, and each chain passes over an inwardly extending ledge or rim 3ᵃ on the adjacent plate 3, below the plates 49. The upper run of the chain is thus held straight to support the staves at this point in their travel. The bars 47 are movable vertically, and each bar is guided by means of a pair of rollers 52. The said rollers are journaled on the frame on opposite sides of the bar and each roller has an annular flange 53 on its outer end which over-lies the face of the bar. The plates 49 may yield upwardly to relieve undue strain, and the said plates may yield a certain distance without affecting the swinging frame 14ª. Whenever however, the spring 37 can no longer compensate for this strain, the swinging frame 14ª is lifted together with the shaft 14 and the friction wheel 17. Whenever the plates 49 are so lifted, the wheel 17 is moved more firmly into contact with the disks 25, thus increasing the friction between the wheel and the disks. The edges of the saws 24 are adjacent to the upper edges of the plates 49, and the cutting plane of the saws is inclined with respect to the plane of the staves, to bevel the ends thereof, as they are carried past the saws by the chains 6.

Each chain 6 is provided at spaced intervals with lugs 54 (Fig. 3), each lug having its front face perpendicular to the top of the frame, and the rear face inclined. The lugs of the chains register, and each stave is engaged near each end by a lug, and carried past the saws.

A cutter in the form of a shank 55, having one end pointed and beveled to form a cutting edge 56 is held by a bracket 5 on the frame adjacent to each saw. Each bracket is provided with feet 58, held to the frame by screws or bolts 59, and each bracket is provided with a vertical groove or guideway 60. The shank 55 fits in the guideway, and is held in place by means of screws 6, threaded into the bracket on each side of the guideway, and overlapping the shank. By loosening the screws, the blade may be adjusted vertically, and when the screws are tightened the blade is clamped in place.

In operation, the staves are moved past the saws by the carrier consisting of the chains. The plates 3 and 49 form a guide for the staves, for holding them flat, and for preventing them lifting. Should a stave of greater thickness or one having irregularities be placed on the carrier, the plates 49 will be lifted to permit it to pass. The ends of the said plates 49 are rounded, as indicated at 62 for the above mentioned purpose. The saws cut the ends of the staves, thus at a single operation equalizing the staves as to length, and putting the proper bevel at each end. When the staves have passed the saws, they are engaged by the knives, which trim the ends, removing any splinters, or ragged edges that may remain. The said knives are arranged at the connection of the plates 49 with bars 47, so that the staves are firmly held at this point. The staves move continually one after the other, and the saws are driven by the friction disk 17. The pressure exerted on the staves may be regulated by means of the springs 37.

The machine is especially adapted for making staves, for sugar hogsheads.

The tension of the spring 37 is adjusted by means of the nuts 38, so that when the saws 24 are not cutting, the wheel 17 will barely engage the disks 25 just enough to run the saws. Whenever however, the saws engage the staves the bars are lifted by the staves passing thereunder, and the friction is increased between the wheels 17 and the disk 25. The gage plates 49 will be moved downwardly by the weight of the parts connected therewith, when no staves are beneath the said plates. Should a stave heavier than usual move under the gage plates, they will be lifted higher than usual, and will thus increase the friction between the wheels and the disks.

I claim:

1. A machine of the character specified, comprising a main frame, a swinging frame hinged at one edge to the main frame, a driving shaft journaled on the swinging frame, a friction disk secured to the shaft, said disk having oppositely arranged beveled friction faces, a shaft journaled on each side of the friction disk in inclined position, each shaft having a friction disk engaging the adjacent friction face of the first-named disk, a trimming saw on the outer end of each shaft, an endless carrier adjacent to each saw for supporting the adjacent ends of the staves, a plate arranged adjacent to each carrier and longitudinally thereof for engaging the upper faces of the adjacent ends of the staves, each plate having its ends rounded on their under faces, a bar adjacent to each plate, each bar having an overhanging portion to which the adjacent plate is secured, a rod connected with the lower end of each bar, a shaft journaled adjacent to the free edge of the swinging frame, a radial arm on the shaft at each end of the said free edge, a hanger-plate connecting each arm to the swinging frame, a radial arm at each end of the said shaft, each arm having a vertical opening, a rod secured to the lower end of each of the bars and passing through the perforation of the adjacent arm, a spring encircling each rod below the arm, and a nut threaded on to the rod below the spring.

2. A machine of the character specified, comprising a main frame, a swinging frame hinged at one edge to the main frame, a driving shaft journaled on the swinging frame, a friction disk secured to the shaft, said disk having oppositely arranged beveled friction faces, a shaft journaled on each side of the friction disk in inclined position, each shaft having a friction disk engaging the adjacent friction face of the first-named disk, a trimming saw on the outer end of each shaft, an endless carrier adjacent to each saw for supporting the adjacent ends of the staves, a plate arranged adjacent to each carrier and longitudinally thereof for engaging the upper faces of the adjacent ends of the staves, each plate having its ends rounded on their under faces, a bar adjacent to each plate, each bar having an over-hanging portion to which the adjacent plate is secured, a sliding connection between the lower end of each bar and the swinging frame, a spring interposed in the connection, and means for varying the tension of the spring.

3. A machine of the character specified, comprising a main frame, a swinging frame hinged at one edge to the main frame, a driving shaft journaled on the swinging frame, a friction disk secured to the shaft, said disk having oppositely arranged beveled friction faces, a shaft journaled on each side of the friction disk in inclined position, each shaft having a friction disk engaging the adjacent friction face of the first-named disk, a trimming saw on the outer end of each shaft, an endless carrier adjacent to each saw for supporting the adjacent ends of the staves, a plate arranged adjacent to each carrier and longitudinally thereof for engaging the upper faces of the adjacent ends of the staves, each plate having its ends rounded on their under faces, a bar adjacent to each plate, each bar having an over-hanging portion to which the adjacent plate is secured, and a yielding connection between the lower end of each bar and the swinging frame.

4. A machine of the character specified, comprising a main frame, a swinging frame hinged at one edge to the main frame, a driving shaft journaled on the swinging frame, a friction disk secured to the shaft, said disk having oppositely arranged beveled friction faces, a shaft journaled on each side of the friction disk in inclined position, each shaft having a friction disk engaging the adjacent friction face of the first-named disk, a trimming saw on the outer end of each shaft, an endless carrier adjacent to each saw for supporting the adjacent ends of the staves, a plate arranged adjacent to each carrier and longitudinally thereof for engaging the upper faces of the adjacent ends of the staves, a bar movable vertically on the frame adjacent to each plate, each bar being connected to the adjacent plate, a yielding connection between the lower end of each bar and the swinging frame, and means for varying the tension of the said connection.

5. A machine of the character specified, comprising a main frame, a swinging frame hinged at one edge to the main frame, a driving shaft journaled on the swinging frame, a friction disk secured to the shaft, said disk having oppositely arranged beveled friction faces, a shaft journaled on each side of the friction disk in inclined position, each shaft having a friction disk engaging the adjacent friction face of the first-named disk, a trimming saw on the outer end of each shaft, an endless carrier adjacent to each saw for supporting the adjacent ends of the staves, a plate arranged adjacent to each carrier and longitudinally thereof for engaging the upper faces of the adjacent ends of the staves, and a yielding connection between each bar and the swinging frame.

6. A machine of the character specified, comprising a main frame, a swinging frame hinged at one edge to the main frame, a driving shaft journaled on the swinging frame, a trimming device at each end of the frame, means for supporting the staves for movement between the trimming devices, a plate adjacent to each trimming device for engagement by the staves as they pass between the trimming devices, a yielding connection between each plate and the swinging frame, and means for varying the tension of the said connection, a friction disk on the driving shaft, and a friction disk for operating each of the trimming devices and engaging the friction disk of the driving shaft.

7. In a machine of the character specified, a main frame, a swinging frame hinged to the main frame, a driving shaft on the said frame, a trimming device at each end of the frame, a friction connection between the trimming devices and the driving shaft for operating said device, means for moving the staves between the trimming devices, means for engaging the upper faces of the staves as they are moved between the said devices, and a yielding connection between the engaging devices and the swinging frame.

THOMAS G. MARTIN.

Witnesses:
J. Dennis Atkins,
J. S. Parrey.